C. V. ROTE.
BRAKE SHOE AND BRAKE HEAD.
APPLICATION FILED MAR. 16, 1915.
1,213,419.
Patented Jan. 23, 1917.
4 SHEETS—SHEET 1.
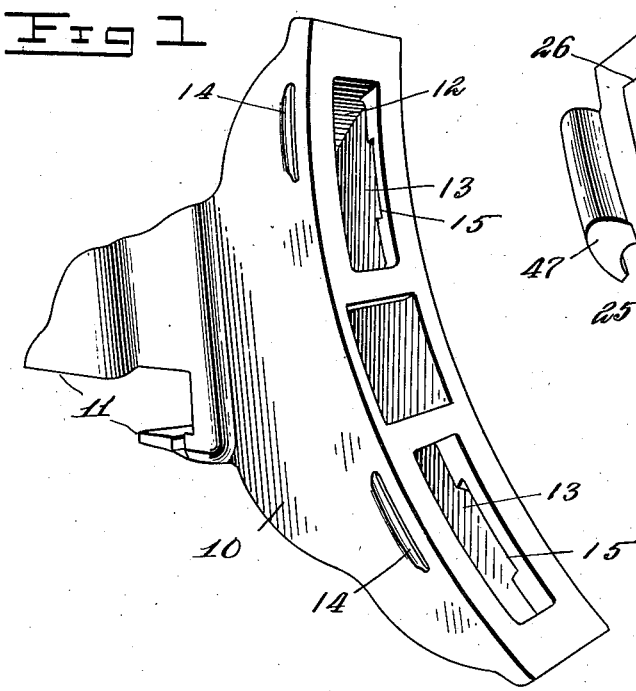
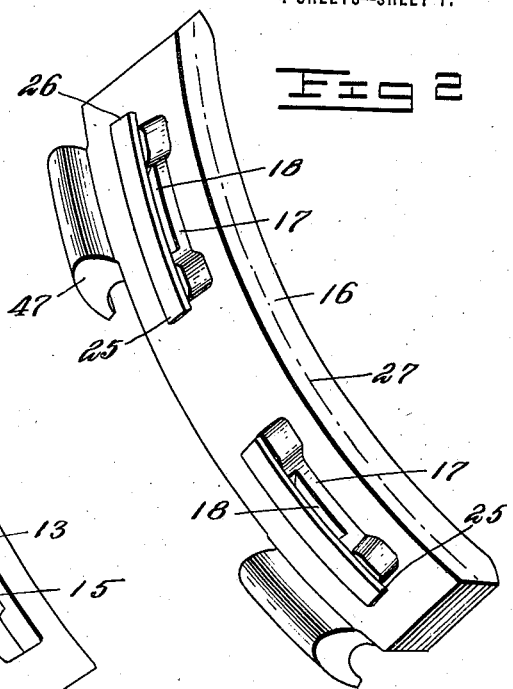
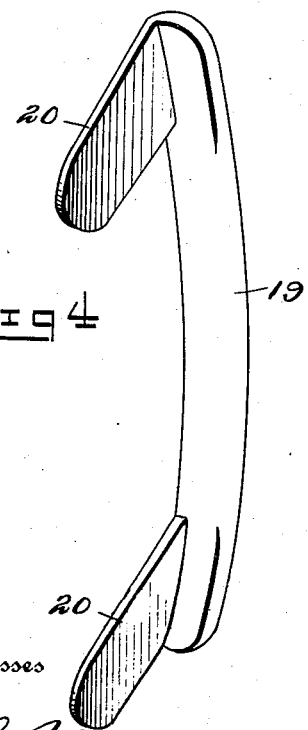
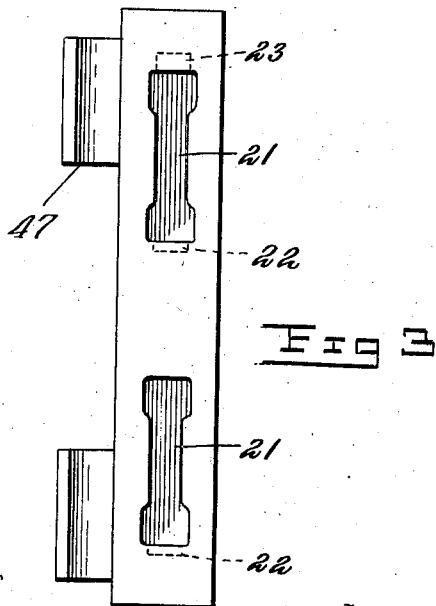
Inventor
Charles V. Rote
Witnesses
H. A. Robinette
T. Clay Lindsey
By
Attorney

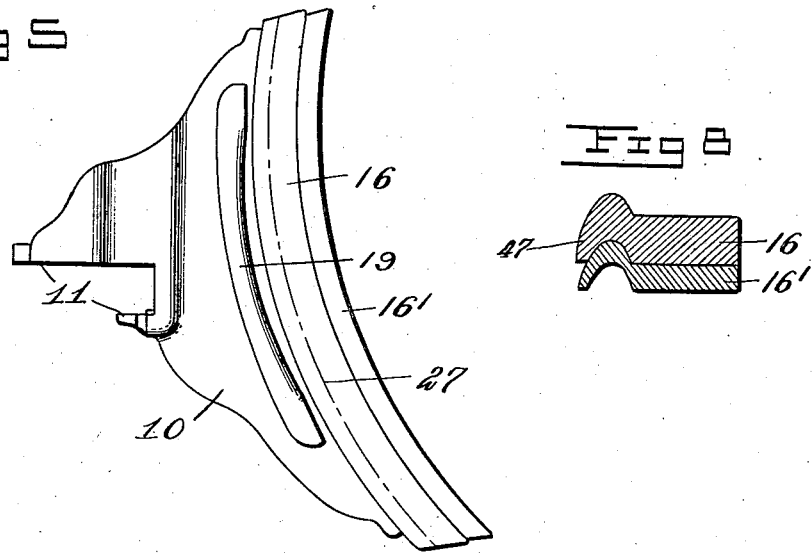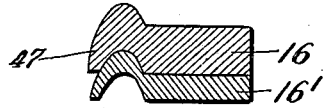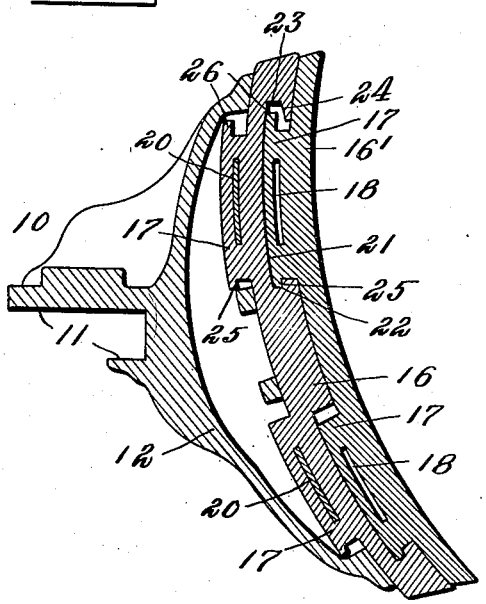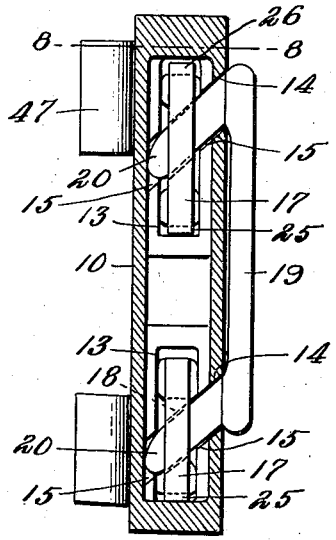

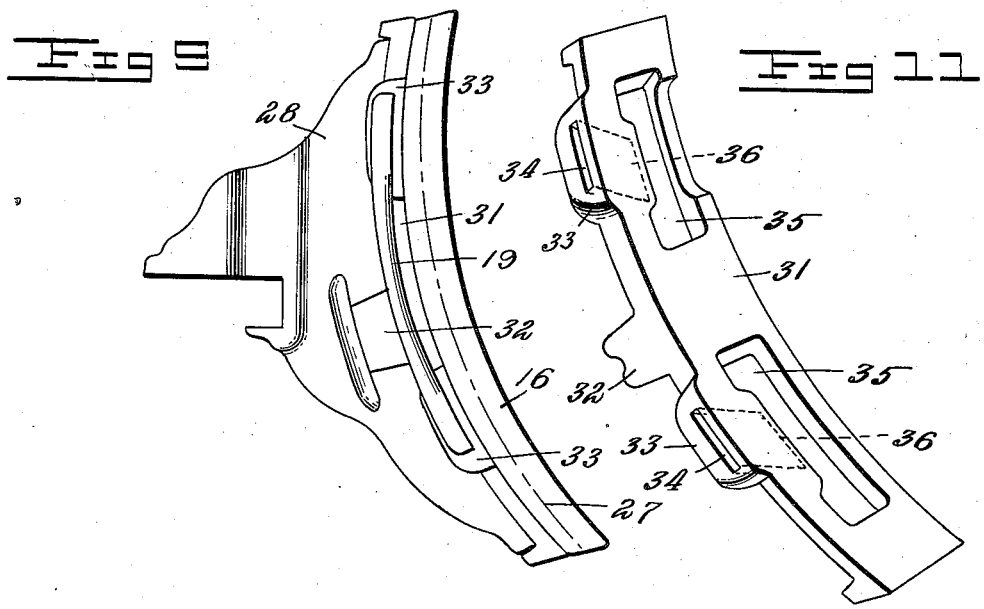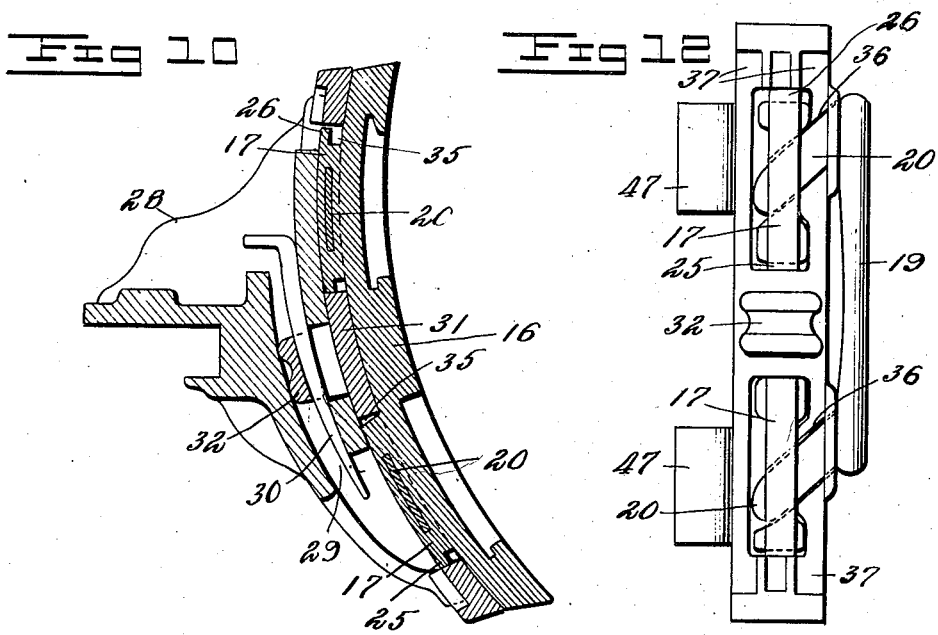

C. V. ROTE.
BRAKE SHOE AND BRAKE HEAD.
APPLICATION FILED MAR. 16, 1915.
1,213,419.
Patented Jan. 23, 1917.
4 SHEETS—SHEET 4.
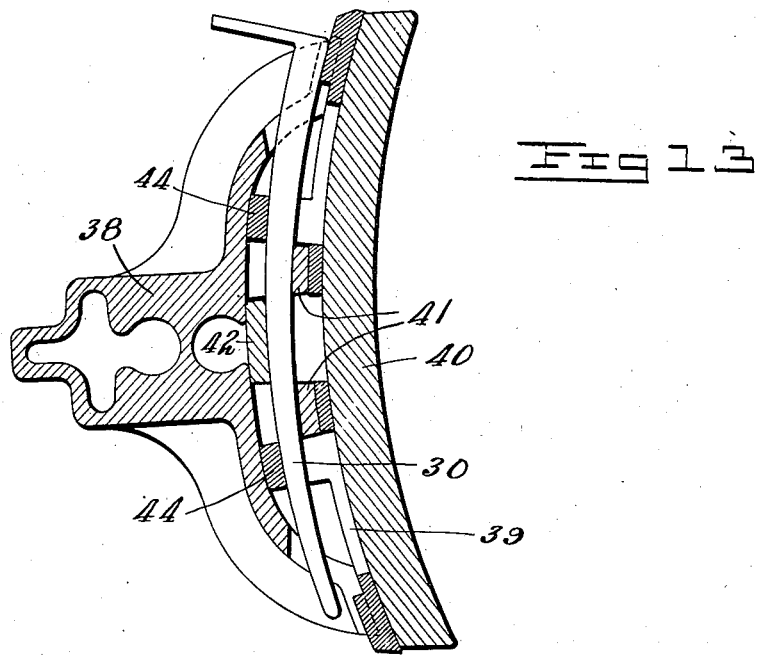
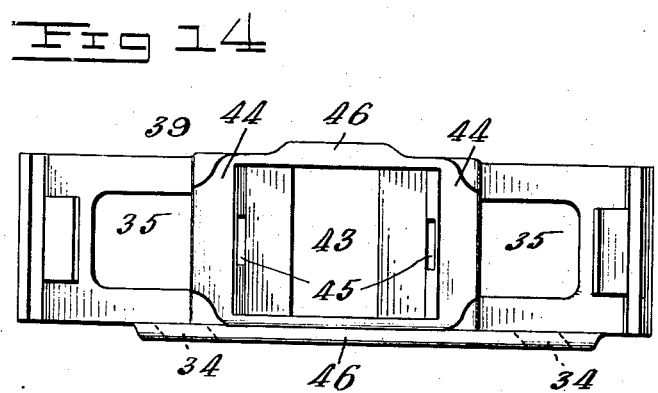
Witnesses
H. G. Robinette
T. Clay Lindsey
Inventor
Charles V. Rote
By Eugene Cushman Rea
Attorney

UNITED STATES PATENT OFFICE.

CHARLES V. ROTE, OF LANCASTER, PENNSYLVANIA, ASSIGNOR TO C. V. ROTE BRAKE SHOE CO., OF LANCASTER, PENNSYLVANIA, A CORPORATION OF DELAWARE.

BRAKE-SHOE AND BRAKE-HEAD.

1,213,419.     Specification of Letters Patent.     Patented Jan. 23, 1917.

Application filed March 16, 1915. Serial No. 14,724.

*To all whom it may concern:*

Be it known that I, CHARLES V. ROTE, a citizen of the United States, residing at Lancaster, in the county of Lancaster and State of Pennsylvania, have invented new and useful Improvements in Brake-Shoes and Brake-Heads, of which the following is a specification.

My invention relates to improvements in brake heads and brake shoes, and has as an object to provide a brake mechanism in which the shoe may be easily and quickly attached to and detached from the head, the means for locking the shoe into place on the head being adapted to be inserted in a simple manner transversely to and at the side of the head whereby access may be readily had to the same.

Brake heads of the form now in use are provided with key-ways passing longitudinally through the heads, which key-ways frequently become filled with snow and the like scraped from the car wheels with the result that the keys which hold the shoes in position upon the heads are frozen into place and cannot be withdrawn without first thawing out the keys when it is desired to renew the shoes, and, therefore, great inconvenience and delay are occasioned.

It is an object of this invention to overcome these difficulties by providing a brake head without a longitudinal key-way and in which the interior of the same is entirely inclosed, and accumulations of ice and the like therein is prevented.

It is a further object of the invention to provide means whereby a brake shoe made in accordance with this invention may be attached to brake heads of the forms now in general use.

Still another object of my invention is to provide a brake shoe such that when it becomes partially worn it may be detached from the brake head and readily and quickly attached to the working face of the new shoe whereby the material of the former may be completely used up.

With the above and other objects, my invention consists in the novel combination and arrangement of parts which will be more fully set forth in the following specification and drawings, in which—

Figure 1 is a front outside perspective view of my improved brake head. Fig. 2 is a rear outside perspective view of my improved brake shoe detached from the head. Fig. 3 is a front elevation of the brake shoe shown in Fig. 2. Fig. 4 is a perspective view of the key for securing the brake shoe to the brake head. Fig. 5 is a side elevation showing the improved brake head with a partially worn shoe and a new shoe made in accordance with this invention applied thereto. Fig. 6 is a vertical section taken through Fig. 5. Fig. 7 is a rear view of the improved brake shoe assembled on the brake head, the rear of the latter being broken away. Fig. 8 is a cross-sectional view taken on line 8—8 of Fig. 7, showing the cross-sectional contour of the interfitting shoes. Fig. 9 discloses a brake shoe embodying the features of this invention as applied to one form of brake head now in common use. Fig. 10 is a vertical section taken through Fig. 9. Fig. 11 is a perspective view of the intermediate member adapted to be secured to the old form of brake head shown in Fig. 9 for securing the improved brake shoe thereto. Fig. 12 is a rear view of the intermediate member shown in Fig. 11 with the brake shoe of Fig. 2 secured thereon. Fig. 13 is a vertical section showing a modified form of intermediate member as applied to a different old form of brake head with an old form of brake shoe secured thereon. Fig. 14 is a rear view of a modified form of intermediate member.

In the drawings, 10 designates my improved brake head having flanges or lugs 11 adapted for attachment to a brake beam. It is noted, however, that the manner of attaching the brake head to the brake beam is immaterial as the same forms no part of my invention. The brake head 10 is substantially a hollow shell with the rear wall 12 thereof unbroken and extending from one end of the brake head to the other, such that the wall 12 together with the side walls of the brake head, substantially inclose the hollow portion thereof to prevent the accumulation of snow and the like therein. The front wall of the brake head is provided with slots or apertures 13 to receive the lugs of the brake shoe hereinafter described. Adjacent the upper corresponding ends of the slots 13, and in one side of the brake head 10, preferably on that side facing away from the car, are elongated slots or openings 14 to receive the blades of the key as hereinafter explained. In alinement with the openings or slots 14 and extending obliquely downward therefrom across the inner face of the front wall of the brake head are grooves 15.

Upon the convex or rear surface of the brake shoe 16 and extending longitudinally thereof are a plurality of spaced-apart lugs or keepers 17, each of which is provided with a key-way 18. The key-ways 18 extend obliquely and transversely through the lugs 17 and register with the grooves 15 of the head when the shoe 16 is in place on the latter.

The means for attaching or securing the shoe 16 to the brake head 10 comprises a key member having a handle portion 19 slightly curved to conform to the curvature of the wearing face of the shoe, and blades 20 extending obliquely from the ends of the handle 19 in parallelism with each other.

When it is desired to secure the shoe 16 to the brake head 10, the former is seated upon the front face of the head with the lugs or keepers 17 of the shoe engaging in the slots or openings 13, the key-ways 18 of the lugs 17 registering with the grooves 15 in the front wall of the brake head 10. The blades 20 of the key are then inserted through the opening 14 in the side of the brake head 10, into the grooves 15 and through the key-ways 18. As the grooves 15 and the key-ways 17 extend obliquely downwardly, and the blades 20 are inserted obliquely downwardly, the key member after the ends of the blades are inserted in the openings 14 will of itself fall into place and will be held by gravity against displacement by the vibrations of the car.

As has been stated, it is one of the objects of the invention to totally use up the partially worn out brake shoe and thus prevent the present scrapping of the same. To accomplish this result, I provide recesses 21 in the front or wearing face of each shoe, the recesses being in spaced-apart relation corresponding to that of the lugs or keepers 17 upon the convex surface of the shoe. The lower ends of the recesses 21 are undercut as shown at 22. One of the recesses 21, preferably the top one, has also its upper end undercut as at 23, the last-mentioned undercut portion being substantially twice the depth of the undercut portion 12. The outer face of the undercut portion 23 is preferably beveled as designated at 24. The lugs or keepers 17 have at their lower ends protruding or overhanging portions 25 corresponding to the undercut portions 22 of the recesses 21. The top lug 17 at its upper end has also an overhanging portion 26 which corresponds to the undercut portion 23; that is, it is substantially double the length of the overhanging portion 25. It will be noted that the length of the keepers 17 is less than that of the recesses 21.

When the shoe becomes worn to such an extent that it should be removed from the brake-head 10, such condition being brought to the notice of the attendant by means of the danger line 27, or other suitable mark on the side of the brake shoe, the same is detached from the head 10 and a new shoe is secured to the latter. The partially worn shoe, designated by 16' in the drawings, is then secured to the wearing face of the new shoe 16 in the following manner: The overhanging portion 26 is inserted into the undercut portion 23; the old shoe 16' is moved upward relatively to the new shoe 16, so that the lug 26 is brought into its uppermost position in the recesses 21; the bottom end of the old shoe 16' is swung inwardly toward the head 10 to bring the lugs 17 into the recesses 21 and to bring the overhanging portions 25 of the lugs 17 into registry with the lower undercut portion 22. The old shoe 16' is then permitted to fall into place to move the lugs 17 down in the recesses 21 and engage the overhanging portions 25 in the undercut portions 22 of the recesses 21. As very little clearance is allowed between the periphery of the car wheel and the wearing of the shoe even when the brakes are not "on", it is impossible for the partially worn shoes to become detached from the face of the new shoe.

Referring to the embodiment of my invention shown in Figs. 9 to 12, in which is disclosed my improved shoe applied to a form of head now in general use on street railway cars, 28 designates the old form of brake head having the usual key-way 29 in which is adapted to be inserted the now used tapered key 30. In this embodiment the improved brake shoe 16 is of the same construction as that above disclosed.

I provide an intermediate member 31 which is adapted to be secured upon the front face of the head 28 and to receive the improved brake shoe 16. The intermediate member 31 has a central lug or keeper 32 adapted to be inserted in the opening in the front wall of the brake-head 28. The lug 32 has an opening therethrough into which the key 30 extends to secure the intermediate member 31 to the brake head 28. On one side of the intermediate member 31, are spaced-apart lugs 33 having elongated slots 34 which correspond to the elongated slots 14 in my improved form of brake head 10 as heretofore described. The intermediate member 31 is also provided with openings or slots 35 adapted to receive the lugs or keepers 17 of the shoe 16 and grooves 36 extending obliquely from the elongated openings 34. The manner of attaching the brake shoe 16 to the intermediate member 31 is similar to that described for attaching the shoe 16 to my improved form of brake-head 10. The intermediate member 31 is provided with lateral recesses or seats 37 to receive the usual bifurcated ends of the brake head 28.

If desired a partially worn brake shoe 16' may be secured to the wearing face of the new brake shoe 16 when the latter is on the intermediate member 31.

It will be seen that should a car which is provided with the old form of brake head 28 and the shoe 16 of my invention be transferred to a different road which does not use my improved shoe, and the latter should become worn or damaged, it is only necessary to remove the intermediate member 31 and attach to the head 28 the now generally used Master Car Builders' shoe.

Figs. 13 and 14 disclose another embodiment of my improved intermediate member to the front face of which may be attached either an old form of brake shoe or my improved brake-shoe 16 heretofore described. 38 is a form of brake head now in general use on steam railway cars, and more particularly on freight cars. 39 is an intermediate member, and 40 is an old form of brake shoe known as the Master Car Builders' brake shoe. The brake head 38 is provided on its front face with a pair of lugs or keepers 41 between which is inserted the keeper 42 provided on the rear face of the brake shoe 40. The intermediate member 39 is provided with slots 35 to receive the keeper 17 of my improved shoe 16 and side openings 34 for the reception of the blades 20 of my improved key member. The intermediate member is provided with a central aperture or transverse slot 43 to receive the keeper 42 on the brake shoe 40 when it is desired to secure the latter on the brake head 38. At either side of the central slot 43 of the intermediate member 39 is a lug or keeper 44 having an opening 45 therethrough which registers with the openings in the keepers 41 and 42 and through which passes the tapered key 30, whereby the member 39 and the shoe 40 are secured to the brake head 38. The keepers are reinforced by side members 46. It will be noted that should it be desired to attach my improved shoe 16 to the brake head 38, the intermediate member 39 is placed upon the front face of the brake head 38 and the key 30 passed through the keepers 44 of the intermediate member 39 and the keepers 42 of the brake head. The lugs 17 of my improved shoe 16 are then inserted into the slots 35 and the key member inserted in the side openings 34 of the intermediate member 39 as heretofore described. Should it be desired to substitute a Master Car Builders' shoe 40, my improved shoe 16 is removed; the key 30 is withdrawn from the head 38; the old form of shoe 40 is placed against the front face of the intermediate member 39; and the key 30 is then inserted through the registering openings in the keepers 41, 42 and 44.

It is obvious that a partially worn brake shoe 16' may be assembled or placed upon the face of my improved shoe 16 after the latter is secured to the intermediate member 39.

The shoe 16 is provided with flanges 47 adapted to engage the flange of the car wheel. The flanges 47 are formed on one side of the shoe, and the flanges 47 are concavo-convex in cross-section, and are formed along their longitudinal central portion of substantially the same thickness as the body of the shoe itself. The flanges 47 are of such contour that the rear surfaces of the flanges of one shoe will fit snugly in the concave surface of the shoe to which the first one is secured. By this construction, it will be noted that one flange greatly reinforces the other, and at the same time the thickness of the flanges 47 and the body of the shoe remain substantially the same during the life of the shoe.

It is obvious that the structure shown and described herein is susceptible to various modifications and changes in form, proportion and arrangement of parts within the scope of the claims without departing from the principle of the invention.

What I claim as new is,—

1. In a brake mechanism, a supporting member, a brake shoe adapted to seat against the face of said supporting member, and locking means adapted to extend transversely through said supporting member and said shoe and adapted to move inwardly and downwardly therein.

2. In a brake mechanism, a supporting member, a brake shoe adapted to seat thereagainst, and locking means extending transversely into the supporting member and through said shoe to secure the latter to said supporting member, said locking means also extending obliquely downwardly and inwardly whereby to retain the locking means in place by gravity.

3. In a brake mechanism, a supporting member, a brake shoe adapted to seat against the front face of said supporting member, and a key having oblique blades adapted to be inserted downwardly and transversely into the supporting member and through said shoe to lock the latter to the supporting member.

4. In a brake mechanism, a supporting member, a brake shoe adapted to seat against the front face of said supporting member, and means for locking said shoe to said member comprising a handle having spaced-apart blades extending obliquely therefrom in parallelism with each other, said blades being adapted to extend downwardly and inwardly into said supporting member and through said shoe, whereby to retain the locking means in place by gravity.

5. In a brake mechanism, a supporting member having a key-way in the side thereof, a brake shoe adapted to seat against the front face of said supporting member and having a key-way adapted to register with the key-way of said supporting member, and means adapted to extend obliquely into said first key-way and through said second key-way to lock the shoe to the supporting member.

6. In a brake mechanism, a supporting member having a key-way in the side thereof, a shoe having an oblique and downwardly extending key-way adapted to register with the key-way of said supporting member, and means adapted to extend into said first key-way and through said second key-way to lock the shoe to the supporting member.

7. In a brake mechanism, a supporting member, and a brake shoe each having a plurality of spaced-apart registering and obliquely inwardly extending key-ways, and a key member having a plurality of blades corresponding in position and obliquity to said key-ways and adapted to be inserted therein to lock the shoe to the supporting member.

8. In a brake mechanism, a supporting member having slots in its front face, and openings in the side thereof adjacent said slots, a brake shoe adapted to seat against the front face of said supporting member and having lugs projecting into said slots, said lugs having key-ways in registry with said openings in the supporting member, and a key extending through said openings and said key-ways to lock the shoe to the supporting member.

9. In a brake mechanism, a supporting member having slots in its front face and openings in one side, a brake shoe adapted to seat against the front face of said supporting member and having lugs projecting into said slots, the lugs having key-ways extending downwardly and inwardly in registry with the openings in said supporting members, and a key extending through said openings and said key-ways to lock the shoe to the supporting member.

10. In a brake mechanism; a supporting member having slots in its front face, opening in one side, and downwardly and inwardly extending grooves leading from the openings and traversing said slots; a brake shoe adapted to seat against the front face of the supporting member and having lugs projecting into said slots, the slots having lateral key-ways therethrough in registry with said grooves; and a key extending through said openings into said grooves and through the key-ways to lock the brake shoe to the supporting member.

11. In a brake mechanism, a brake head, a brake shoe adapted to seat against the front face of said head, and locking means adapted to be inserted in the side of said head and shoe and to move inwardly and downwardly into locking position.

12. In a brake mechanism, a brake head, a brake shoe adapted to seat against the front face of said head, and means for locking said shoe to said head comprising a handle having spaced-apart blades extending obliquely therefrom and in parallelism, said blades being adapted to extend downwardly and inwardly into said brake head and through said shoe whereby the locking means is held in place by gravity.

13. In a brake mechanism, a brake head having key-ways on the interior face of its front wall, and openings in its side wall, a brake shoe having a key-way adapted to register with said first key-way and means adapted to extend obliquely into said key-ways to lock the shoe to the head.

14. In a brake mechanism, a brake head having a key-way extending inwardly from the side thereof, a brake shoe adapted to seat against the front face of said brake head having key-ways adapted to register with the key-ways of said brake head, and locking means adapted to extend obliquely through said key-ways to secure the shoes to the head, said locking means extending downwardly and inwardly whereby the same is returned to place by gravity.

15. In a brake mechanism; a brake head having slots in its front face, openings in one side, and downwardly and inwardly extending grooves leading from the openings and traversing said slots, a brake shoe adapted to seat against the front face of the brake head and having lugs projecting into said slots, the lugs having lateral key-ways therethrough in registry with said grooves, and a key extending through said openings and said grooves and through the key-ways to lock the shoe to the brake head.

16. In a brake mechanism, a supporting member, and a brake shoe, each having a plurality of spaced apart registering key-ways, and a key member having a plurality of blades corresponding in position to said key-ways, said key member being adapted to be inserted transversely into said supporting member and to drop by gravity into locking position.

17. In a brake shoe, a body portion having recesses on its wearing face, the corresponding ends of said recesses being undercut, and lugs on the rear face of said body portion having transverse keyways for attaching the shoe to a head and also having overhanging ends corresponding to the undercut portions of said recesses, said lugs being adapted to extend into the recesses of another shoe with the overhanging ends of the lugs engaging in said undercut portions.

18. In a brake shoe, a body portion having recesses in its wearing face, the corresponding ends of which are undercut, one of said recesses also having its opposite end undercut, and lugs on the rear face of said body portion having overhanging ends corresponding to said undercut portions of said recesses, one of said lugs also having an overhanging end corresponding to said second undercut portion of the recess, said lugs being adapted to extend into the recesses of another shoe with the overhanging ends of the lugs engaging in the undercut portions of the recesses.

19. In a brake shoe, a body portion having spaced-apart recesses on its wearing face, the corresponding lower ends of the recesses being undercut, one of said recesses also having at its upper end an undercut portion substantially twice the depth of said first undercut portions, lugs on the face of said body portion, the lower ends of the lugs extending outwardly to correspond to the first-mentioned undercut portions of said recesses, one of said lugs having at its upper end an outwardly extending portion substantially twice the length of said first-mentioned outwardly extending portions to correspond with the second-mentioned undercut portion of said recess, the lugs of one shoe being adapted to extend into the recesses of a second shoe with the overhanging portions of the lugs engaging in the undercut portions of the recesses.

20. In a brake shoe, a continuous body portion having a lug on its rear face provided with a keyway, said body portion also having a recess in its wearing face, and means on said lug independent of said keyway for engaging in said recess of a corresponding shoe to lock one shoe to the wearing face of a second shoe.

In testimony whereof I have hereunto set my hand in presence of two subscribing witnesses.

CHARLES V. ROTE.

Witnesses:
  GERTRUDE M. STUCKER,
  T. CLAY LINDSEY.